United States Patent [19]
Hester, Jr. et al.

[11] 3,887,575
[45] June 3, 1975

[54] 9H-DIBENZO[C, F]-S-TRIAZOLO[4,3-A]AZEPINES

[75] Inventors: Jackson B. Hester, Jr., Galesburg; Jacob Szmuszkovicz, Kalamazoo, both of Mich.

[73] Assignee: The Upjohn Company, Kalamazoo, Mich.

[22] Filed: Jan. 30, 1974

[21] Appl. No.: 437,818

Related U.S. Application Data

[63] Continuation-in-part of Ser. No. 313,208, Dec. 8, 1972, Pat. No. 3,850,942, which is a continuation-in-part of Ser. No. 227,916, Feb. 22, 1972, abandoned.

[52] U.S. Cl. ............ 260/308 R; 71/92; 260/239 D; 260/239.3 T; 260/247.5 EP; 260/268 PC; 260/293.59; 260/247.1 E; 424/248; 424/250; 424/267; 424/269
[51] Int. Cl. C07d 57/02; C07d 57/04; C07d 99/02
[58] Field of Search ............... 260/308 R, 247.1 E, 260/247.5 EP, 268 PC, 293.59

[56] References Cited
FOREIGN PATENTS OR APPLICATIONS
2,306,762  8/1973  Germany ........................ 260/308 R

*Primary Examiner*—Alton D. Rollins
*Attorney, Agent, or Firm*—Hans L. Berneis

[57] ABSTRACT

Compounds of the formula III:

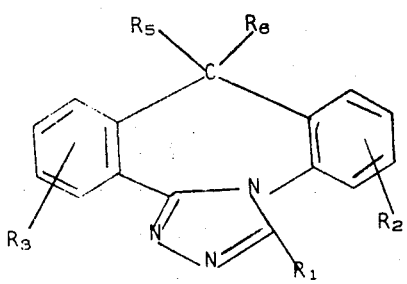

wherein $R_5$ and $R_6$ are each selected from the group consisting of hydrogen and alkyl of 1 to 3 carbon atoms, inclusive; wherein $R_1$ is selected from the group consisting of hydrogen, hydroxymethyl, alkyl, defined as above,

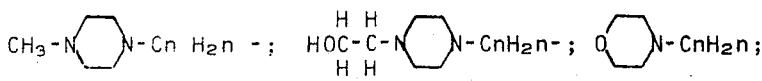

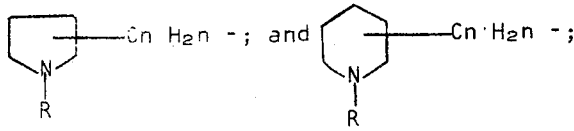

in which n is 1 to 4, inclusive, and R is hydrogen or alkyl defined as above,

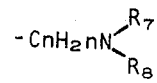

in which $n$ is defined as above, and $R_7$ and $R_8$ are each selected from the group consisting of hydrogen and alkyl as defined above, or

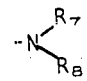

together is pyrrolidino or piperidino; wherein $R_2$ and $R_3$ are selected from the group consisting of hydrogen, fluoro, chloro, bromo, nitro, alkyl, defined as above, trifluoromethyl, and alkoxy, in which the carbon moiety of 1 to 3 carbon atoms, inclusive, are prepared by reacting a thio compound of formula 1:

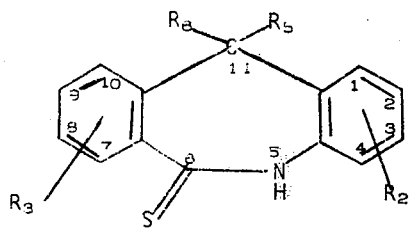

wherein

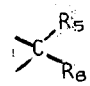

$R_2$ and $R_3$ are defined as above, with a selected carboxylic acid hydrazide, or, in two steps, with hydrazine and then a carboxylic acid halide or anhydride. The resulting products (11) can be further modified to yield the other compounds corresponding to formula 111, as defined above.

Compounds of formula 111 and the pharmacologically acceptable acid addition salts and N-oxides thereof have central nervous antidepressant activity and can be used in mammals and birds.

16 Claims, No Drawings

9H-DIBENZO[C,F]-S-TRIAZOLO[4,3-A]AZEPINES

CROSS-REFERENCES TO RELATED APPLICATION

This application is a continuation-in-part of application Ser. No. 313,208 filed Dec. 8, 1972, now U.S. Pat. No. 3,850,942, which is a continuation-in-part of application Ser. No. 227,916, filed Feb. 22, 1972, and now abandoned.

BACKGROUND OF THE INVENTION

1. Field of the Invention

This invention is directed to new organic compounds and is particularly concerned with novel compounds of formula II and III and processes for the production thereof.

The novel compounds and the process of production therefor can be illustratively represented as follows:

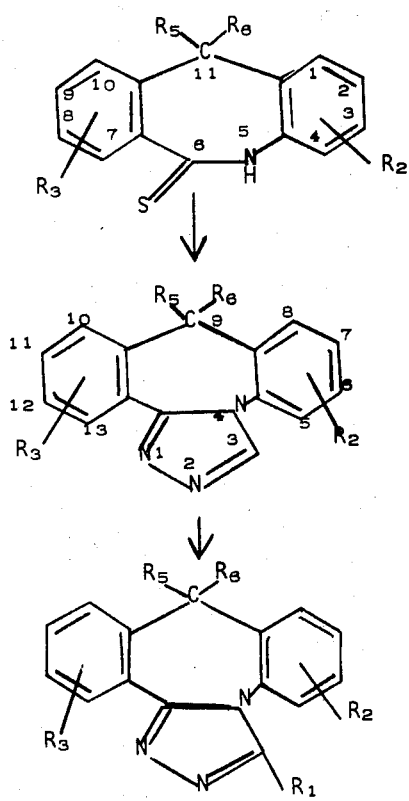

wherein $R_5$ and $R_6$ are each selected from the group consisting of hydrogen and alkyl of 1 to 3 carbon atoms, inclusive; where $R_1$ is selected from the group consisting of hydrogen, hydroxymethyl, alkyl defined as above,

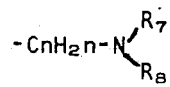

in which $n$ is 1 to 4, inclusive, and R is hydrogen and alkyl defined as above, or $R_1$ is

in which $n$ is defined as above, and $R_7$ and $R_8$ are each selected from the group consisting of hydrogen and alkyl as defined above, or $$-N\begin{matrix}R_7\\R_8\end{matrix}$$

together is pyrrolidino, or piperidino; wherein $R_2$ and $R_3$ are selected from the group consisting of hydrogen, fluoro, chloro, bromo, nitro, alkyl defined as above, trifluoromethyl, and alkoxy, in which the carbon moiety is of 1 to 3 carbon atoms, inclusive. Compound II (the 3-position is unsubstituted) can be substituted e.g. by halogenation and then reacting the halo compounds with ammonia, substituted amines, or the like by conventional procedures.

The preferred compounds of this invention are of the formula:

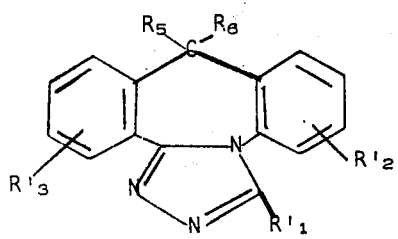

wherein $R_5$ and $R_6$ are selected from the group consisting of hydrogen or alkyl of 1 to 3 carbon atoms, inclusive; wherein $R'_1$ is selected from the group consisting of hydrogen, alkyl, as defined above, hydroxymethyl,

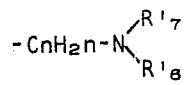

in which $n$ is 1 to 3 inclusive, and $R'_7$ and $R'_8$ are each selected from the group consisting of hydrogen and alkyl as defined above, or

together is pyrrolidino; wherein $R'_2$ and $R'_3$ are hydrogen, fluoro, or chloro, and the pharmacologically acceptable acid addition salts thereof.

The invention also embraces the pharmacologically acceptable acid addition salts and N-oxides of the compounds of formula III, above.

The process of this invention comprises: heating a thio compound of formula I with formic acid hydrazide or hydrazine and triethyl orthoformate to obtain the triazole compound II. Compounds III can also be obtained by heating compounds of formula I with a se-

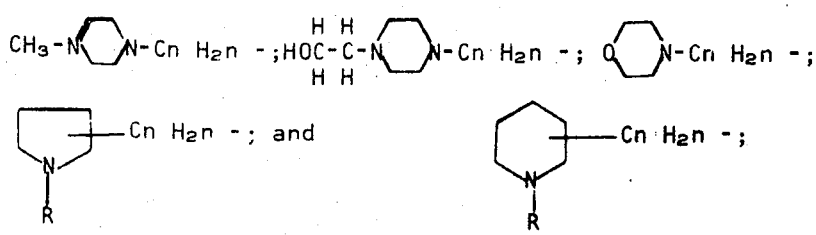

lected carboxylic acid hyrazide of 2 to 4 carbon atoms, inclusive, or hydrazine and carboxylic halide,

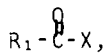

wherein $R_1$ is as defined above, and X is chlorine or bromine.

DESCRIPTION OF THE PREFERRED EMBODIMENT

Lower alkyl groups of 1 to 3 carbon atoms, inclusive, are exemplified by methyl, ehtyl, propyl, and isopropyl.

The carbon chain moiety of alkoxy of 1 to 3 carbon atoms, inclusive, can be defined as lower-alkyl of 1 to 3 carbon atoms, inclusive, above.

The group $CnH_2 n$ wherein $n$ is 1 to 4 comprises $—CH_2—$, $—(CH_2)_2—$, $—(CH_2)_3—$, $—(CH_2)_4—$, and branched alkylene groups.

The compounds of formula III and the pharmacologically acceptable acid addition salts are useful central nervous system agents for the control of depression and anxiety in mammals and birds.

For the control of depression the compounds of formula III and the pharmacologically acceptable acid addition salts can be used in dosages of 0.1 to 5.0 mg./kg. in oral or injectable preparations to alleviate depression occurring in stressful situations in the same manner as imipramine, amitriptylene and other antidepressants. Such situations are those, for example, when animals are changing ownership or are temporarily put into kennels while their owners are absent from home.

For the control of anxiety the compounds of formula III and the pharmacologically acceptable acid addition salts can be used in dosages of 0.01 to 10 mg./kg. in oral and injectable preparations to alleviate tension and anxiety in mammals or birds in the same way as doxepine and other antianxiety agents. Such stressful situations arise, for example, when animals are in travel.

Acid addition salts of the compounds of formula III can be made, such as the fluosilicic acid addition salts which can be applied as mothproofing agents, and salts with trichloroacetic acid, useful as herbicides against Johnson grass, Bermuda grass, yellow and red foxtail, and quack grass.

The pharmaceutical forms of compounds of formula III and salts thereof contemplated by this invention include pharmaceutical compositions suited for oral, parenteral, and rectal use, e.g. tablets, powder packets, cachets, dragees, capsules, solutions, suspension, sterile injectable forms, suppositories, bougies, and the like. Suitable diluents or carriers such as carbohydrates, lactose, proteins, lipids, calcium phosphate, cornstarch, stearic acid, methylcellulose and the like may be used as carriers or for coating purposes. Water or oils such as coconut oil, sesame oil, safflower oil, cottonseed oil and peanut oil, may be used for preparing solutions or suspensions of the active drug. Sweetening, coloring, and flavoring agents may be added.

For mammals food premixes with starch, oatmeal, dried fishmeat, fishmeal, flour, and the like can be prepared.

The starting materials of this invention, dihydrodibenzoazepinethiones I, are either known or can be synthesized by known procedures e.g. by refluxing the corresponding amides with phosphorus pentasulfide, as further illustrated in the Preparations.

In carrying out the process of this invention, a selected thione I, is heated with a formic acid hydrazide to about 200° for a period of 30 minutes to 4 hours. Product II which is thus obtained, is isolated and purified by conventional means, e.g. extraction, filtration, chromatography or crystallization.

Alternatively the thione-starting material I can be treated with hydrazine or hydrazine hydrate at temperatures between 25–100°C. with or without a solvent such as ethanol or other alkanol, ether, tetrahydrofuran, benzene or the like for 1 to 4 hours to give the corresponding intermediate IV:

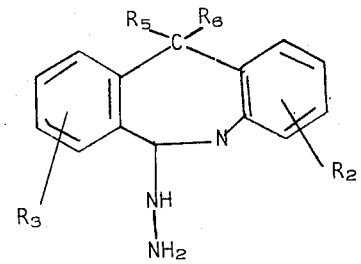

wherein $R_2$, $R_3$, $R_5$ and $R_6$ are defined as above. Compound IV can be condensed with an acid halide of the formula

wherein $R_1$ is defined alkyl and X is bromine or chlorine to give the corresponding compound of formula III.

If ethyl orthoformate is used, a 3-unsubstituted 9H-dibenzo[c,f]-s-triazolo[4,3-a]azepine is obtained which can be brominated and the resulting bromo compound can be used as intermediate for additional 3-substituted compounds of formula III as shown in the Examples.

The following preparations and examples are illustrative of the processes and products of the present invention, but are not to be construed as limiting.

Preparation 1 6(5H)-morphanthridinethione

A mixture of 6(5H)-morphanthridinone (30 g., 0.144 mole), phosphorus pentasulfide (33.5 g., 0.158 mole) and 1200 ml. of pyridine was heated at reflux temperature for 23 hours and the pyridine was then evaporated. Methylene chloride and water were added, and the organic layer was separated (some solid was present), washed with aqueous sodium bicarbonate until only a trace of solid was present, then with saturated salt solution, dried over anhydrous magnesium sulfate and evaporated. Trituration of the residue with methanol gave 28.8 g. of 6(5H-morphanthridinethione of melting point 218°–219°C. Crystallization from methylene chloride-methanol gave the product as pale yellow rods; the melting point was unchanged.

Anal. calcd. for $C_{14}H_{11}N_2$: C, 74.63; H, 4.92; N, 6.22; S, 14.23. Found: C, 74.94; H, 5.07; N, 6.08; S, 14.25.

Preparation 2 3,8-dichloro-5,10-dihydro-6H-dibenz[b,e]-azepine-6-thione.

In the manner given in Preparation 1 3,8-dichloro-5,11-dihydro-6H-dibenz[b,e]azepine-6-one was heated with phosphorus pentasulfide to give 3,8-dichloro-5,11-dihydro-6H-dibenz[b,e]azepine-6-thione.

In the manner given in the preceding preparation, other starting compounds of formula I can be prepared. Representative starting compounds, thus obtained, comprise:

3,8-dichloro-11,11-dimethyl-5,11-dihydro-6H-dibenz[b,e]-azepine-6-thione;
8-nitro-2-bromo-5,11-dihydro-6H-dibenz[b,e]azepine-6-thione;
8-fluoro-5,11-dihydro-6H-dibenz[b,e]azepine-6-thione;
3-trifluoromethyl-5,11-dihydro-6H-dibenz[b,e]azepine-6-thione; and the like.

EXAMPLE 1

9H-dibenzo[c,f]-s-triazolo[4,3-a]azepine

A mixture of 5,11-dihydro-6H-dibenzo[b,e]azepine-6-thione[6(5H)morphanthoridinethione] prepared as described above (0.0186 mole) and formic acid hydrazide (0.186 mole) is kept in a preheated oil bath for 1 hour at 200°C. using a take-off condenser. The mixture is cooled, water and chloroform are added, and the suspension is filtered to give 9H-dibenzo[c,f]-s-triazolo[4,3-a]azepine.

EXAMPLE 2

6,12-Dichloro-9H-dibenzo[c,f]-s-triazolo[4,3-a]azepine

A mixture of 3,8-dichloro-5,11-dihydro-6H-dibenz[b,e]azepine-6-thione was condensed during 1 hour at about 200° C. with formic acid hydrazide to give 6,12-dichloro-9H-dibenzo[c,f]-s-triazolo[4,3-a]azepine.

EXAMPLE 3

6, 12-dichloro-9,9-dimethyl-9H-dibenzo[c,f]s-triazolo[4,3-a]azepine

In the manner given in Example 2, 3,8-dichloro-11,11-dimethyl-5,11-dihydro-6H-dibenz[b,e]azepine-6-thione was condensed at about 200° C. with formic acid

EXAMPLE 4

12-nitro-7-bromo-3-(cyanomethyl)-9H-dibenzo[c,f]-s-triazolo[4,3-a]azepine

In the manner given in Example 2,8-nitro-2-bromo-5,11-dihydro-6H-dibenz[b,e]azepine-6-thione was condensed at about 200°C. with cyanoacetic acid hydrazide to give 12-nitro-7-bromo-3-(cyanomethyl)-9H-dibenzo[c,f]-s-triazolo[4,3-a]azepine.

EXAMPLE 5

3-[(Chloro)methyl]-9H-dibenzo[c,f]-s-triazolo[4,3-a]azepine

To a stirred solution of 6(5H)-morphanthridine-11-thione, 0.0186 mole, in dry methanol (1,500 ml.) was added hydrazine hydrate 0.743 mole, 100%. A nitrogen bubbler was used to aid in the removal of the hydrogen sulfide formed. The reaction mixture was refluxed via steam bath for 1½ hours and concentrated in vacuo. The oil was mixed with water and extracted with benzene. The benzene was washed with water several times, then acidified with aqueous hydrogen chloride. The hydrochloride salt was collected by filtration, washed with benzene and dried to give 6-hydrazinomorphanthridine hydrochloride. The aqueous layer of the filtrate was made basic with aqueous sodium hydroxide and extracted with chloroform. The chloroform was washed with water, dried (sodium sulfate) and concentrated in vacuo to give 6-hydrazinomorphanthridine.

To a stirred ice-cold solution of 6-hydrazinomorphanthridine (2.23 g., 0.01 mole) in dry tetrahydrofuran (25 ml.), under nitrogen was slowly added chloroacetyl chloride (1.12 g, 0.01 mole) in tetrahydrofuran (5 ml.). After 15 minutes the ice-bath was removed and the reaction allowed to rise to ambient temperature (21°–24° C.) and stirred for 1 hour. The hydrochloric acid salt of the adduct was collected by filtration, washed with ether and dried in a vacuum oven (40° C.) to give 3.32 g. of product. This hydrochloric acid salt was combined with glacial acetic acid (40 ml.) and heated, under nitrogen in an oil bath at 120° C. for 20 minutes. The acetic acid was removed in vacuo and the residue mixed with water, neutralized with sodium bicarbonate and extracted with chloroform. The extract was washed with water, dried over anhydrous sodium sulfate and concentrated. The residue was chromatographed on silica gel (280 g.) with 5 percent methanol-95 percent chloroform. The product thus obtained was crystallized from ethyl acetate Skellysolve B hexanes to give 1.82 (65%) of 3-[(Chloro)-methyl]-9 H-dibenzo[c,f]-s-triazolo[4,3-a]azepine of melting point 148°–150° C.

EXAMPLE 6

3-[(Dimethylamino)methyl]-9H-dibenzo[c,f]-s-triazolo[4,3-a]azepine.

To a stirred solution of 3-(chloromethyl)-9H-dibenzo[c,f]-s-triazolo[4,3-a]azepine in tetrahydrofuran was added sodium iodide (1.5 g., 0.01 mole) and dimethylamine (125 ml. of a saturated methanol solution) under nitrogen. The mixture was stirred at ambient temperature for 1½ hours, diluted with cold water and extracted with chloroform. The extract was washed with water, dried over anhydrous sodium sulfate and concentrated in vacuo. The residue was dissolved in ethanol and precipitated upon concentrating to give 2.12 g. of a product of melting point 172°–174° C. (73%). This product was recrystallized from ethanol-ethyl acetate to give 1.55 g. of 3-[(dimethylamino)methyl]-9H-dibenzo[c,f]-s-triazolo[4,3-a]azepine of melting point 173°–175° and 0.95 g. of melting point 168°–180°. The analytical sample had a melting point of 173°–175° C.

Anal. calcd. for $C_{18}H_{18}N_4$: C, 74.45; H, 6.25; N, 19.30. Found: C, 74.23; H, 6.22; N, 19.61.

EXAMPLE 7

9H-Dibenzo[c,f]-s-triazolo[4,3-a]azepine

To a stirred ice-cold solution of H-dibenzo[c,f]-s-triazolo-[6-hydrazinomorphanthridine (13.40 g., 0.06 mole) in dry chloroform (480 ml.) was added triethylorthoformate (44.4 g., 0.3 mole) under nitrogen, and sufuric acid (6.6 ml.) dropwise. After 15 min. the ice-bath was removed and the reaction mixture allowed to rise to ambient temperature and then stirred for 2 hours. The chloroform was washed with aqueous sodium bicarbonate solution, thereupon with water, dried over anhydrous sodium sulfate, treated with water and concentrated in vacuo. The oil was dissolved in ethyl acetate and crystallized to give 6.41 g. of 9H-dibenzo[c,f]-s-triazolo[4,3-a]azepine of melting point 154°–160° C. and 5.05 g. of melting point 165°–168° C.

(overall yield 82%). The analytical sample had a melting point 165°–168° C.

Anal. calcd. for $C_{15}H_{11}N_3$: C, 77.23; H, 4.75; N, 18.02, Found: C, 76.85; H, 4.76; N, 17.50,

EXAMPLE 8

3-[(Diethylamino)methyl]-9H-dibenzo[c,f]-s-triazolo[4,3-a]azepine

To a stirred solution of 3-chloromethyl-9H-dibenzo[c,f]-s-triazolo[4,3-a]azepine (2.82 g., 0.01 mole) in dry tetrahydrofuran (100 ml.) was added sodium iodide (1.5 g., 0.01 mole) and diethylamine (10 ml.) under nitrogen. The mixture was stirred at ambient temperature for 1½ hour, mixed with cold water and extracted with chloroform. The chloroform was washed with water, dried over sodium sulfate and concentrated in vacuo. The residue was recrystallized twice from ehtyl acetate-Skelly-solve B hexanes to give 0.98 g. of 3-[(diethylamino)-methyl]-9H-dibenzo[c,f]-s-triazolo[4,3-a]azepine of melting point 132°–135° and 0.70 g. of melting point 130°–133° (overall yield 53%). The analytical sample had a melting point of 132°–134°.

Anal. calcd. for $C_{20}H_{22}N_4$: C, 75.44; H, 6.96; N, 17.60. Found: C, 74.97; H, 6.94; N, 17.95.

EXAMPLE 9

3-(pyrrolidinomethyl)-9H-dibenzo[c,f]-s-triazolo[4,3-a]azepine.

To a stirred solution of 3-chloromethyl-9H-dibenzo[c,f]-s-triazolo[4,3-a]azepine (2.82 g., 0.01 mole) in dry tetrahydrofuran (100 ml.) was added sodium iodide (1.50 g., 0.01 mole) and pyrrolidine (10 ml.) under nitrogen. The mixture was stirred at ambient temperature for 1½ hour, mixed with cold water, and extracted with chloroform. The chloroform was washed with water, dried over sodium sulfate and concentrated in vacuo. The residue was crystallized from ethyl acetate-Skelly-solve B hexanes to give 1.315 g. of 3-(pyrrolidinomethyl)-9H-dibenzo[c,f]-s-triazolo[4,3-a]azepine (42%) of melting point 168°–171° C. The analytical sample had a melting point of 168°–171° C.

Anal. calcd. for $C_{20}H_{20}N_4$: C, 75.92; H, 6.37; N, 17.71. Found: C, 75.57; H, 6.45; N, 17.73.

EXAMPLE 10

3-(2-Chloroethyl)-9H-dibenzo[c,f]-s-triazolo]4,3-a]azepine

To a stirred ice-cold solution of 6-hydrazinomorphanthridine (2.23 g., 0.01 mole) in dry tetrahydrofuran (25 ml.) was slowly added 3-chloropropionyl chloride (1.27 g., 0.01 mole) in tetrahydrofuran (5 ml.) under nitrogen. After 20 minutes the ice bath was removed and the mixture was allowed to rise to ambient temperature, and stirred for 1 hour. The hydrochloric acid salt was collected by filtration, washed with ether and dried in a vacuum oven (40°) to give 3.50 g.

This hydrochloride was combined with glacial acetic acid (40 ml.) and heated under nitrogen in an oil bath at 120° for 10–15 min. The acetic acid was removed in vacuo and the residue mixed with water, neutralized with sodium bicarbonate and extracted with chloroform. The chloroform was washed with water, dried over sodium sulfate and concentrated in vacuo. The residue was crystallized from methanol-chloroform-ethyl acetate to give 1.19 g. of 3-(2-chloroethyl)-9H-dibenzo[c,f]-s-triazolo[4,3-a]azepine of melting point 178°–183° C. and 0.65 g., of melting point 182°–183° C. (overall yield 62%). The analytical sample had a melting point of 182°–183° C.

Anal. calcd. for $C_{17}H_{14}N_3Cl$: C, 69.03; H, 4.77; N, 14.21; Cl, 11.99. Found: C, 68.72; H, 4.77; N, 13.85; Cl, 12.19.

EXAMPLE 11

3-[2-(Dimethylamino)ethyl]-9H-dibenzo[c,f]-s-triazolo[4,3-a]azepine

To a stirred solution of 3-(2-chloroethyl)-9H-dibenzo[c,f]-s-triazolo[4,3-a]azepine (1.48 g., 0.005 mole) in dry dimethylformamide (25 ml.) was added potassium iodide (1.66 g., 0.01 mole) and dimethylamine (15 ml. of a saturated solution in methanol) under nitrogen. The mixture was stirred at ambient temperature for 4 hours, mixed with cold water and extracted with methylene chloride. The methylene chloride extract was washed with water, dried over sodium sulfate, and concentrated in vacuo. The residue was crystallized from ethyl acetate-Skellysolve B hexanes to give 0.96 g. (63%), of melting point 110°–111° C. This was recrystallized from ethyl acetate-Skellysolve B hexanes and seeded with the higher melting polymorph (melting point 137°–138° (to give 0.90 g. of 3-]2-(dimethylamino)ethyl]-9H-dibenzo[c,f]-s-triazolo[4,3-a]azepine of melting point 136°–139° C. The analytical sample had a melting point of 135°–137° C.

Anal. calcd. for $C_{19}H_{20}N_4$: C, 74.97; H, 6.62; N, 18.41. Found: C, 74.80; H, 6.81; N, 18.29.

EXAMPLE 12

3-(2-pyrrolidinoethyl)-9H-dibenzo[c,f]-s-triazolo[4,3-a]azepine

To a stirred solution of 3-(2-chloroethyl)-9H-dibenzo[c,f]-s-triazolo[4,3-a]azepine (1.48 g., 0.005 mole) in dry dimethylformamide (20 ml.) was added potassium iodide (1.66 g., 0.01 mole) and pyrrolidine (10 ml.) under nitrogen. The mixture was stirred at ambient temperature for 20 hours, mixed with water and extracted with chloroform. The chloroform was washed with water, dried over sodium sulfate and concentrated in vacuo. The residue was crystallized from ethyl acetate Skelly B to give 1.11 g. (67%) of melting point 176°–179° of 3-(2-pyrrolidinoethyl)-9H-dibenzo[c,f]-s-triazolo[4,3-a]-azepine. The analytical sample had a melting point of 176°–179°.

Anal. calcd. for $C_{21}H_{22}N_4$: C, 76.33; H, 6.71; N, 16.96. Found: C, 76.01; H, 6.89; N, 17.34.

EXAMPLE 13

3-(3-Chloropropyl)-9H-dibenzo[c,f]-s-triazolo[4,3-a]azepine

To a stirred ice-cold solution of 6-hydrazinomorphanthriidine (6.69 g., 0.03 mole) in dry tetrahydrofuran (100 ml.) under nitrogen was slowly added 4-chlorobutyryl chloride (4.23 g., 0.03 mole) in tetrahydrofuran (25 ml.). After 30 minutes the ice-bath was removed and the reaction allowed to rise to ambient temperature and stirred for 1 hour. The hydrochloride salt of the adduct was collected by filtration, washed with ether and dried in a vacuum oven (40°) to give 10.37 g.

This hydrochloride was combined with glacial acetic acid (50 ml.) and heated, under nitrogen in an oil bath at 120° for 15 min. The acetic acid was removed in vacuo and the residue mixed with water, neutralized with sodium bicarbonate and extracted with chloroform. The chloroform was washed with water, dried over sodium sulfate and concentrated in vacuo. The oil was dissolved in ethyl acetate and crystallized upon concentration to give 7.46 g., of melting point 179°–181° and 0.56 g., of melting point 180°–181° (overall yield 89%) of 3-(3-chloropropyl)-9H-dibenzo[c,f]-s-triazolo[4,3-a]azepine. The analytical sample was recrystallized from methanol-ethyl acetate and had a melting point of 188°–190° C.

Anal. calcd. for $C_{18}H_{16}N_3Cl$: C, 69.78; H, 5.21; N, 13.56; Cl, 11.45. Found: C, 69.77; H, 5.20; N, 13.59; Cl, 11.98.

EXAMPLE 14

3-[3-(Dimethylamino)propyl]-9H-dibenzo[c,f]-s-triazolo[4,3-a]azepine dihydrochloride To a stirred solution of 3-(3-chloropropyl)-9H-dibenzo[c,f]-s-triazolo[4,3-a]azepine (3.10 g., 0.01 mole) in dry dimethylformamide (50 ml.) was added sodium iodide (0.50 g.) and dimethylamine (10 ml. of 25% aqueous solution) under nitrogen. The mixture was stirred and heated in a steambath overnight, mixed with water, neutralized with sodium bicarbonate and extracted with chloroform. The chloroform was dissolved in ethyl acetate, acidified with ethanolic hydrogen chloride and the salt recrystallized from methanol ethyl acetate to give 0.245 g., of melting point 259°–267° and 1.105 g., of melting point 259°–266° (overall yield 69%) of 3-[3-(dimethylamino)propyl]-9H-dibenzo[c,f]-s-triazolo[4,3-a]azepine dihydrochloride. The analytical sample had a melting point of 259°–266°.

Anal. calcd. for $C_{20}H_{24}N_4Cl_2$: C, 61.38; H, 6.18; N, 14.32; Cl, 18.12. Found: C, 61.11; H, 6.20; N, 14.48; Cl, 18.12.

EXAMPLE 15

3-[3-(Diethylamino)propyl]-9H-dibenzo[c,f]-s-triazolo[4,3-a]azepine dihydrochloride To a stirred solution of 3-(3-chloropropyl)-9H-dibenzo[c,f]-s-triazolo[4,3-a]azepine (1.55 g., 0.005 mole) in dry dimethylformamide (50 ml.) was added potassium iodide (1.66 g., 0.01 mole) and diethylamine (15 ml.) under nitrogen. The mixture was stirred at ambient temperature for 18 hours but was raised to 50° for 24 hours to complete the reaction. The mixture was mixed with water and extracted with chloroform. The chloroform was washed with water, dried over sodium sulfate and concentrated in vacuo. The oil was dissolved in ethyl acetate, treated with Darco acidified with methanolic hydrogen chloride and recrystallized from methanol ethyl acetate to give 1.43 g. (68%), of melting point 258°–263° of 3-[3-(diethylamino)propyl]-9H-dibenzo[c,f]-s-triazolo[4,3-a]azepine dihydrochloride. The analytical sample had a melting point of 256°–262°.

Anal. calcd. for $C_{22}H_{28}N_4Cl_2$: C, 63.00; H, 6.73; N, 13.36; Cl, 16.91. Found: C, 62.77; H, 6.89; N, 13.30; Cl, 17.50.

EXAMPLE 16

3-(3-pyrrolidinopropyl)-9H-dibenzo[c,f]-s-triazolo[4,3-a]azepine dihydrochloride To a stirred solution of 3-(3-chloropropyl)-9H-dibenzo[c,f]-s-triazolo[4,3-a]azepine (1.55 g., 0.005 mole) in dry dimethylformamide (50 ml.), was added potassium iodide (1.66 g. 0.01 mole) and pyrrolidine (15 ml.) under nitrogen. The mixture was stirred at ambient temperature for 18 hours, mixed with water and extracted with chloroform. The chloroform was washed with water, dried over sodium sulfate and concentrated in vacuo. The oil was dissolved in ethyl acetate, acidified with methanolic hydrogen chloride and recrystallized from methanol-ethyl acetate to give 1.92 g. (92%), of melting point 265°–270° of 3-(3-pyrrolidinopropyl)-9H-dibenzo[c,f]-s-triazolo[4,3-a]azepine dihydrochloride. The analytical sample had a melting point of 265°–270°.

Anal. calcd. for $C_{22}H_{26}N_4Cl_2$: C, 63.30; H, 6.28; N, 13.42; Cl, 16.99. Found: C, 62.89; H, 6.38; N, 13.45; Cl, 17.20.

EXAMPLE 17

3-Vinyl-9H-dibenzo[c,f]-s-triazolo[4,3-a]-azepine

To a stirred solution of 3-(2-chloroethyl)-9H-dibenzo[c,f]-s-triazolo[4,30a]azepine (1.48 g., 0.005 mole) in dry dimethylformamide (25 ml.) was added potassium iodide (1.66 g., 0.01 mole) and diethylamine (10 ml.) under nitrogen. The mixture was stirred at ambient temperature for 1½ hour, mixed with water and extracted with chloroform. The chloroform was washed with water, dried over sodium sulfate and concentrated in vacuo. The residue was dissolved in methanol chloroform ethyl acetate decolorized with Darco and crystallized from methanol chloroform ethyl acetate Skelly B to give 0.455 g. (35%), of 3-vinyl-9H-dibenzo[c,f]-s-triazolo[4,3-a]-azepine, of melting point 186°–187° (incomplete melt). The analytical sample had a melting point of 186°–187° (incomplete melt).

Anal. calcd. for $C_{17}H_{13}N_3$: C, 78.74; H, 5.05; N, 16.21. Found: C, 79.52; H, 5.30; N, 15.99.

EXAMPLE 18

9,9-Dimethyl-9H-dibenzo[c,f]-s-triazolo[4,3-a]azepine

In the manner given in Example 1, 11,11-dimethyl-6(5H)-morphanthridinethione was condensed with formic acid hydrazide at about 200° C, to give 9,9-dimethyl-9H-dibenzo[c,f]-s-triazolo[4,3-a]azepine

EXAMPLE 19

3-[(dimethylamino)methyl]-9,9-dimethyl-9H-dibenzo[c,f]-s-triazolo[4,3-a]azepine

In the manner given in Example 45, 3-(chloromethyl)-9,9-dimethyl-9H-dibenzo[c,f]-s-triazolo[4,3-a]azepine was reacted with sodium iodide and dimethylamine at ambient temperature to give 3-[(dimethylamino)methyl]-9,9-dimethyl-9H-dibenzo[c,f]-s-triazolo[4,3-a]azepine.

EXAMPLE 20

3,9,9-Trimethyl-9H-dibenzo[c,f]-s-triazolo-azepine

A solution of 11,11-dimethyl-6(5H)-morphanthridinethione (5.0 g.; 0.02 moles) and acethydrazide (14.8 g., 0.2 mole) in 25 ml. of n-butanol was stirred at room temperature under nitrogen for 24 hours followed by heating at 80° C. for 20 hours. The solvent was removed in vacuo and the residue was crystallized from isopropanol to give 3.11 g. (56.6%) of 3,-

9,9-trimethyl-9H-dibenzo[c,f]-s-triazolo[4,3-a]azepine as isopropanol solvate, melting point 262°–265°.

Anal. calcd. for $C_{18}H_{17}N_{13}$ $1/6C_3H_8O$: C, 78.25; H, 6.20; N, 14.80. Found: C, 78.26; H, 6.18; N, 14.47.

In the manner illustrated by the beforegoing examples, other compounds of formula II and III can be synthesized. Representative compounds of formula II and III, thus prepared, include:

6-fluoro-9,9-diethyl-9H-dibenzo[c,f]-s-triazolo[4,3-a]azepine;

3-hydroxymethyl-9,9-dimethyl-9H-dibenzo[c,f]-s-triazolo[4,3-a]azepine;

7,11-difluoro-9,9-dipropyl-9H-dibenzo[c,f]-s-triazolo[4,3-a]azepine;

3-hydroxymethyl-9H-dibenzo[c,f]-s-triazolo[4,3-a]azepine;

6,12-difluoro-3-bromo-9H-dibenzo[c,f]-s-triazolo[4,3-a]azepine;

6,12-difluoro-3-(3-morpholinopropyl)-9H-dibenzo[c,f]-s-triazolo[4,3-a][1,4]azepine;

6,11-difloro 3,9-diethyl-9H-dibenzo[c,f]-s-triazolo[4,3-a]azepine;

7-chloro-3,9-diethyl-9H-dibenzo[c,f]-s-triazolo[4,3-a]azepine;

11-methyl-5-bromo-3-propyl-9H-dibenzo[c,f]-s-triazolo[4,3-a]azepine;

7-12-diethoxy-3-[2-(dimethylamino)ethyl]-9H-dibenzo[c,f]-s-triazolo[4,3-a]azepine;

3-hydroxymethyl-7-chloro-9H-dibenzo[c,f]-s-triazolo[4,3-a]azepine;

and the like.

Treating the compounds of formula II and III with a pharmacologically acceptable acid such as hydrochloric, hydrobromic, phosphoric, sulfuric, acetic, propionic, toluenesulfonic, methanesulfonic, tartaric, citric, lactic, malic, maleic, cyclohexanesulfamic acids, and the like or a peracid produces the pharmacologically acceptable salts or N-oxides of these compounds of formula II or III which can be used like the free base compounds of formula II or III. Salt formation is achieved in conventional manner by reacting the compounds of formula II or III with excess of a selected acid in a suitable medium e.g. water, a lower alkanol, ether, or acetone and recovering the salt by evaporating the solvent, preferably in vacuo. The N-oxides are prepared by reacting the compounds of formula II or III with an excess of a peracid such as perbenzoic acid, perphthalic acid, or m-chloroperbenzoic acid, in a solvent such as a lower alkanol, chloroform, or methylene chloride and recovering the N-oxide by evaporating the solvent in vacuo.

We claim:

1. A compound selected from the group consisting of compounds of the formula III

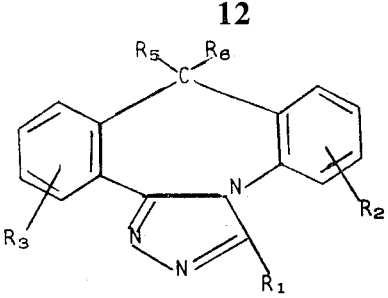

wherein $R_5$ and $R_6$ are each selected from the group consisting of hydrogen and alkyl of 1 to 3 carbon atoms, inclusive; wherein $R_1$ is selected from the group consisting of hydrogen, alkyl as defined as above, hydroxymethyl,

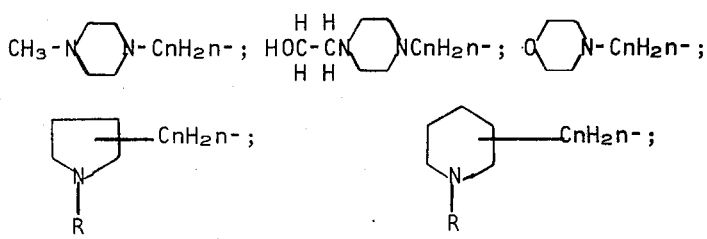

in which $n$ is 1 to 4, inclusive, and R is hydrogen or alkyl defined as above, or $R_1$ is

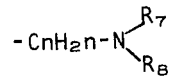

in which $n$ is defined as above, and $R_7$ and $R_8$ are each selected from the group consisting of hydrogen and alkyl as defined above, or

together is pyrrolidino or piperidino; wherein $R_2$ and $R_3$ are selected from the group consisting of hydrogen, fluoro, chloro, bromo, nitro, alkyl defined as above, trifluoromethyl, and alkoxy, in which the carbon moiety is of 1 to 3 carbon atoms, inclusive, and the pharmacologically acceptable acid addition salts.

2. A compound according to claim 1 of the formula

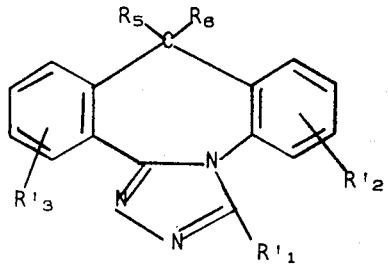

wherein $R_5$ and $R_6$ are selected from the group consisting of hydrogen or alkyl of 1 to 3 carbon atoms; wherein $R'_1$ is hydrogen, alkyl as defined above, hydroxymethyl, or

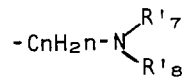

in which n is from 1 to 3, and $R'_7$ and $R'_8$ are each selected from the group consisting of hydrogen and alkyl as defined above, or

together is pyrrolidino or piperidino; wherein $R'_2$ and $R'_3$ are selected from the group consisting of hydrogen, fluoro, or chloro, and the pharmacologically acceptable acid addition salts thereof.

3. The compound of claim 2, wherein $R'_1$ is (dimethylamino)methyl, $R'_2$, $R'_3$, $R_5$, and $R_6$ are hydrogen and the compound is therefore 3-[(dimethylamino)methyl]-9H-dibenzo[c,f]-s-triazolo[4,3-a]azepine.

4. The compound of claim 2, wherein $R'_1$ is (pyrrolidino)methyl, $R'_2$, $R'_3$, $R_5$, and $R_6$ are hydrogen and the compound is therefore 3-[(pyrrolidino)methyl]-9H-[c,f]dibenzo-s-triazolo[4,3-a]azepine.

5. The compound of claim 2, wherein $R'_1$ is 3-[3-(pyrrolidino)propyl], $R'_2$, $R'_3$, $R_5$, and $R_6$ are hydrogen and the compound is therefore 3-[3-(pyrrolidino)propyl]-9H-dibenzo[c,f]-s-triazolo[4,3-a]azepine.

6. The compound of claim 2 wherein $R'_1$, $R'_2$, $R'_3$, $R_5$ and $R_6$ are hydrogen and the compound is therefore 9-H-dibenzo[c,f]-s-triazolo[4,3-a]azepine.

7. 3-Chloromethyl-9H-dibenzo[c,f]-s-triazolo[4,3-a]azepine.

8. The compound of claim 2 wherein $R'_1$ is diethylaminomethyl, $R'_2$, $R'_3$, $R_5$ and $R_6$ are hydrogen, and the compound is therefore 3-[(diethylamino)methyl]-9H-dibenzo[c,f]-s-triazolo[4,3-a]azepine.

9. 3-Vinyl-9H-dibenzo[c,f]-s-triazolo[4,3-a]azepine.

10. A compound according to claim 2 wherein $R'_1$, $R_5$ and $R_6$ are methyl; $R'_2$ and $R'_3$ are hydrogen and the compound is therefore 3,9,9-trimethyl-9H-dibenzo[c,f]-s-triazolo[4,3-a]azepine.

11. 3-[2-(chloro)ethyl]-9H-dibenzo[c,f]-s-triazolo[4,3-a]azepine.

12. The compound of claim 2 wherein $R'_1$ is 2-(dimethylamino)ethyl, $R'_2$, $R'_3$, $R_5$ and $R_6$ are hydrogen and the compound is therefore 3-[2-(dimethylamino)ethyl]-9H-dibenzo[c,f]-s-triazolo[4,3-a]azepine.

13. The compound of claim 2 wherein $R'_1$ is 2-(pyrrolidino)ethyl, $R'_2$, $R'_3$, $R_5$ and $R_6$ are hydrogen and the compound is therefore 3-[2-(pyrrolidino)ethyl]-9H-dibenzo[c,f]-s-triazolo[4,3-a]azepine.

14. 3-[3-(chloro)propyl]-9H-dibenzo[c,f]-s-triazolo[4,3-a]azepine.

15. The compound of claim 2 wherein $R'_1$ is 3-(dimethylamino)propyl, $R'_2$, $R'_3$, $R_5$ and $R_6$ are hydrogen and the compound is therefore 3-[3-(dimethylamino)propyl]-9H-dibenzo[c,f]-s-triazolo[4,3-a]azepine.

16. The compound of claim 2 wherein $R'_1$ is 3-(diethylamino)propyl, $R'_2$, $R'_3$, $R_5$, and $R_6$ are hydrogen and the compound is therefore 3-[3-(diethylamino)propyl]-9H-dibenzo[c,f]-s-triazolo[4,3-a]azepine.

* * * * *